(12) United States Patent
Hwang et al.

(10) Patent No.: US 8,144,339 B2
(45) Date of Patent: Mar. 27, 2012

(54) METHOD AND SYSTEM FOR POSITIONING BY USING OPTICAL SPECKLE

(75) Inventors: Yi-Yuh Hwang, Taoyuan (TW); Chih-Ming Liao, Taoyuan (TW); Chin-Der Hwang, Jhubei (TW); Shin-I Ma, Longtan Township, Taoyuan County (TW); Ting-Wei Chiang, Banciao (TW); Chun-Hao Chen, Tucheng (TW); Wen-Cheng Huang, Taipei (TW); Mau-Ran Wang, Taipei (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 272 days.

(21) Appl. No.: 12/634,707

(22) Filed: Dec. 10, 2009

(65) Prior Publication Data

US 2011/0134434 A1   Jun. 9, 2011

(30) Foreign Application Priority Data

Dec. 4, 2009   (TW) ............................... 98141426 A

(51) Int. Cl.
*G01B 11/14* (2006.01)
*G01B 9/02* (2006.01)

(52) U.S. Cl. .................. 356/614; 356/498; 345/166
(58) Field of Classification Search .......... 356/614–623, 356/498, 499, 521, 496; 345/166, 163
See application file for complete search history.

(56) References Cited

U.S. PATENT DOCUMENTS

| | | | | |
|---|---|---|---|---|
| 5,361,131 A | * | 11/1994 | Tekemori et al. | 356/499 |
| 6,642,506 B1 | * | 11/2003 | Nahum et al. | 250/231.13 |
| 7,715,016 B2 | * | 5/2010 | Hwang et al. | 356/498 |
| 7,737,947 B2 | * | 6/2010 | Schroeder et al. | 345/166 |
| 2002/0105656 A1 | * | 8/2002 | Nahum et al. | 356/614 |
| 2007/0139659 A1 | * | 6/2007 | Hwang et al. | 356/614 |
| 2007/0146729 A1 | * | 6/2007 | Emtman et al. | 356/614 |
| 2011/0262012 A1 | * | 10/2011 | Liao et al. | 382/115 |

FOREIGN PATENT DOCUMENTS

| | | |
|---|---|---|
| JP | 59-134006 U | 9/1984 |
| JP | 2007-198979 A | 8/2007 |
| JP | 2008-002891 A | 1/2008 |
| JP | 2009-139134 A | 6/2009 |

OTHER PUBLICATIONS

English translation of Japanese Office Action in corresponding Japanese Patent Application No. JP 2009-280911, dated Jul. 29, 2011.

* cited by examiner

*Primary Examiner* — Hoa Pham
(74) *Attorney, Agent, or Firm* — Bacon & Thomas, PLLC

(57) ABSTRACT

A method and system for positioning by using optical speckle are disclosed in this invention. A highly coherent laser light irradiates a positioning template in advance to record optical speckles caused by interference by scattered light beams from the positioning template for establishing a speckle database. Furthermore, a reference point is defined to position each recorded speckle. Therefore, a coordinate with respect to the reference point corresponding to a specified speckle can be used to position a target or applied to distance measurement by the speckle database. The precision of the speckles according to the present invention is within several micrometers. Hence, it can provide high precision positioning.

12 Claims, 18 Drawing Sheets

METHOD AND SYSTEM FOR POSITIONING BY USING OPTICAL SPECKLE

FIELD OF THE INVENTION

The present invention relates generally to a two-dimensional precise positioning system and method. More specifically, the present invention relates to a two-dimensional precise positioning system and method by determining change of optical speckles. It can be wildly applied to precise processing machines and positioning instruments.

BACKGROUND OF THE INVENTION

Two-dimensional precise positioning systems are popularly used in precise mechanical processing machines. Related products, such as CCD automatic positioning systems and magnetic induction positioning system are commercially available. Positioning precision of both kinds of devices is around 20 μm.

Telecentric lenses are often used in CCD automatic positioning systems in order to get invariant images in a large scope for precise images comparison and positioning. Although the imaging framework can get better invariant images for positioning, compared images demand sufficient judging features for positioning if a more precise positioning precision is required. In order to achieve sufficient judging features, sampling range needs to be relatively large. Therefore, precision of current mature positioning is around ±20 μm. It is unworkable for the requirement of precise processing machinery. A higher positioning precision is needed for more applications.

Magnetic induction positioning technology utilizes Hall Effect to scan a periodical magnetic positioning template by a magnetic sensing element to get signals of intensity change of a periodic magnetic field by induction. Then, moving distances can be calculated by analyzing the signal. Speed of relative movement of Hall Effect element to the template affects signal intensity change of the magnetic field induction. Hence, when a fast movement needs positioning, magnetic induction positioning precision can not be improved. A mature effective positioning precision is also around 20 μm.

In addition, there are many prior arts about two-dimensional precise positioning system and methods. U.S. Pat. No. 7,042,575 discloses an optical displacement sensor. Please refer to FIG. 1. The invention utilizes light beams to scan a surface and receives optical speckles of the reflected light beams from the surface for further measuring the displacement and locations. It applies mainly to optical mice. For computer input devices, it has an epoch-making meaning. However, coordinates of the scanned object can not be precisely positioned. For application of precise positioning instruments, it doesn't work effectively.

Please refer to FIG. 2. U.S. Pat. No. 7,110,120 provides an optical displacement sensor which can measure a moving body. By scanning an object with light beams directly, separating the scattered light beams reflected from the body by a grating and making the two light beams become two signals with 90° phase difference by a spatial filters, only direction of the displacement can be judged by calculating. In practice, it has no two-dimensional positioning function at all.

U.S. Pat. No. 7,317,538 discloses an optical displacement sensor. Speed of displacement and direction can be obtained by scanning an object with three separated light beams to form three spots on the surface of the object, then calculating scattered light beams from the three spots by analog to digital transform and Fourier transform by Doppler Effect. Please refer to FIG. 3. The method uses complex calculation to measure the speed of displacement and direction of the object. Therefore, reflected light beams have huge affection on the follow-up calculation. Compared with general positioning methods directly using surface features, the '538 patent will have calculation errors caused by data reading and mathematical hypothesis.

Last, please refer to FIG. 4. U.S. Pat. No. 7,242,466 provides a pointing system, for example, an optical mouse, by scanning a pre-coded surface with light beams and receiving scattered light beams from the surface so that movement and location can be further determined. The most notable feature of the invention is the pre-coded surface. With some scattering features and non-scattering features to define a location according to a specified method to arrange a digital pattern, displacement and location of a pointing device receiving scattered light beams relative to a coded surface can be obtained. However, not only is it inconvenient to prepare the pre-coded surface, but also precision is limited.

In summary, current two-dimensional precise positioning systems and methods have several technical inherent problems. The two-dimensional precise positioning system and method utilizing variation of optical speckle provided in the present invention are able to solve the problems mentioned above. It has advantages of wider applications and high precision.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a positioning method by using optical speckles, includes the steps of: a) selecting a point on a surface having unique textures as a reference point; b) partitioning the surface into a number of unit zones to form a two-dimensional zone array and setting location data for the unit zones with respect to the reference point; c) irradiating the surface with a highly coherent parallel light at an incident angle θ to produce scattered light beams and setting a sampling angle φ with respect to normal to the surface for obtaining a first optical speckle image formed by the scattered light beams in every unit zone at the sampling angle φ; d) establishing a look-up table containing the location data of each unit zone and corresponding first optical speckle image thereof; e) capturing a second optical speckle image of a detection point at the sampling angle φ; f) identifying the unit zone where the detection point is located; and g) comparing the first optical speckle image in the unit zone where the detection point is located with the second optical speckle image for obtaining relative location of the detection point to the unit zone, and calculating location data of the detection point with respect to the reference point based on the relative location and location data of the unit zone where the detection point is located.

Preferably, the sampling angle φ is in the range of $0<\phi\leq\theta-10°$ or $\theta+10°\leq\phi<90°$.

Preferably, step f) includes steps of: f1) inserting between two adjacent unit zones a dark zone, which can substantially transmit, absorb or reflect the highly coherent parallel light so that no scattered light beams are generated in the dark zone to form the first optical speckle image or the second optical speckle image, thereby forming a periodical energy change of optical speckles across the surface; and f2) counting number of peaks of optical speckle energy between the detection point and the reference point for identifying the unit zone where the detection point is located.

Preferably, the dark zone has a size smaller than or equal to that of the unit zone.

Preferably, step f) includes steps of: f1) inserting between two adjacent unit zones a reference zone having optical speckle energy lower than that of the unit zones for forming a periodical energy change of optical speckles; and f2) counting number of peaks of optical speckle energy between the detection point and the reference point for identifying the unit zone where the detection point is located.

Preferably, an auxiliary positioning zone in which an optical speckle image can be formed is created among four adjacent unit zones for helping locate the detection point.

In accordance with another aspect of the present invention, a positioning system by using optical speckles, includes: a template having an unique texture surface; an emitting module, for emitting a highly coherent parallel light to irradiate the surface at an incident angle θ to generate scattered light beams; an optical speckle imaging module, provided at a sampling angle φ from normal to the surface, for obtaining a first optical speckle image of the scattered light beams generated by irradiating the surface with the highly coherent parallel light and a second optical speckle image of scattered light beams generated by irradiating a detection point; a sensor module for storing the first optical speckle image and the second optical speckle image; and an identifying/positioning unit for comparing the first optical speckle image and the second optical speckle image, thereby obtaining a location data of the detection point.

Preferably, the system further includes a positioning driving device for driving a target to a designated location by comparing the location data of the detection point obtained by the identifying/positioning unit and the designated location.

Preferably, the sampling angle φ is in the range of 0<φ≦θ−10° or θ+10°≦φ<90°.

Preferably, the emitting module includes a vertical cavity surface emitting laser (VCSEL), an edge emission laser (EEL), a gas laser, a solid-state laser, or a combination of a light emitting diode producing narrow band light and a filter.

Preferably, the sensor module includes a charge-coupled device (CCD) or a complementary metal-oxide-semiconductor (CMOS) sensor.

Preferably, the optical speckle imaging module includes: an imaging lens for imaging the optical speckle onto the sensor module; a front aperture, provided between the imaging lens and the template, for filtering scattered light beams; and a rear aperture, located opposite to the front aperture with respect to the imaging lens, for controlling average radius of the optical speckle. The imaging lens, the front aperture and the rear aperture are linearly arranged in sequence.

Preferably, the optical speckle imaging module includes a condensing lens, located in a path of the scattered light beams at the sampling angle φ, for condensing energy of the optical speckle to an energy sensor.

Preferably, the optical speckle imaging module includes a semi-reflector, located between the imaging lens and the rear aperture, for partially reflecting energy of the optical speckle to an energy sensor.

Preferably, the optical speckle imaging module includes a condensing lens, located in a path of light beam reflected from the surface, for condensing energy of the optical speckle to an energy sensor.

Preferably, the average radius of the optical speckle can be obtained by controlling size of the rear aperture and distance from the rear aperture to the sensor module with a relation of:

$$\delta \approx 1.22 \times (\lambda/D) \times L$$

where δ is average radius of the optical speckle, λ is wavelength of the highly coherent parallel light, D is diameter of the rear aperture, and L is distance between the rear aperture and the sensor module.

DETAILED DESCRIPTION OF THE PREFERRED EMBODIMENTS

The optical speckle sampling technology in the present invention utilizes two-dimensional imaging structure using optical speckles reflected from a non-specular surface to efficiently lower the variation of relative optical path difference of the imaging optical speckle. Therefore, invariance of the optical speckle can be achieved.

Figure 1:
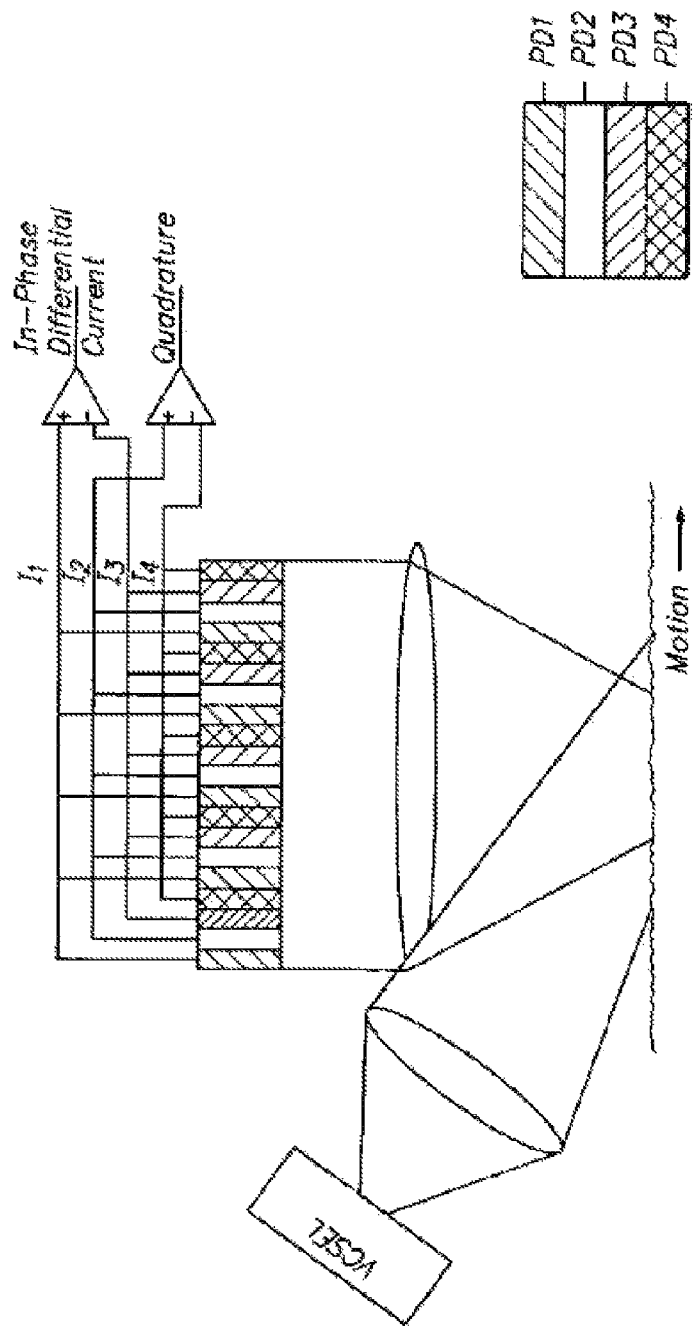
FIG. 1 illustrates a prior art of an optical displacement sensor.
Figure 2:
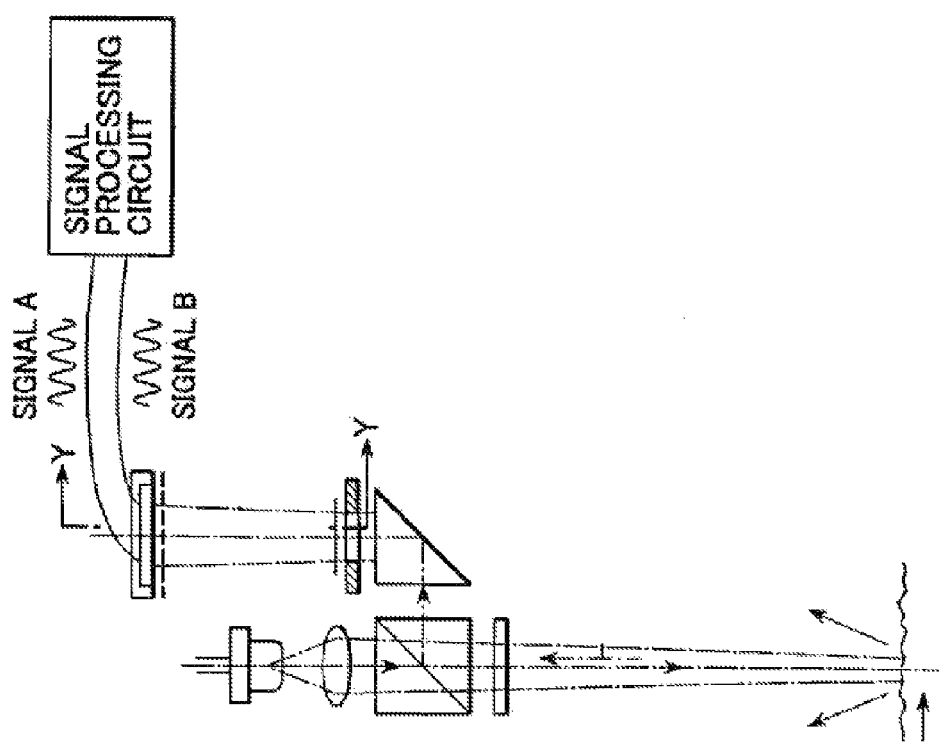
FIG. 2 illustrates another prior art of an optical displacement sensor.
Figure 3:
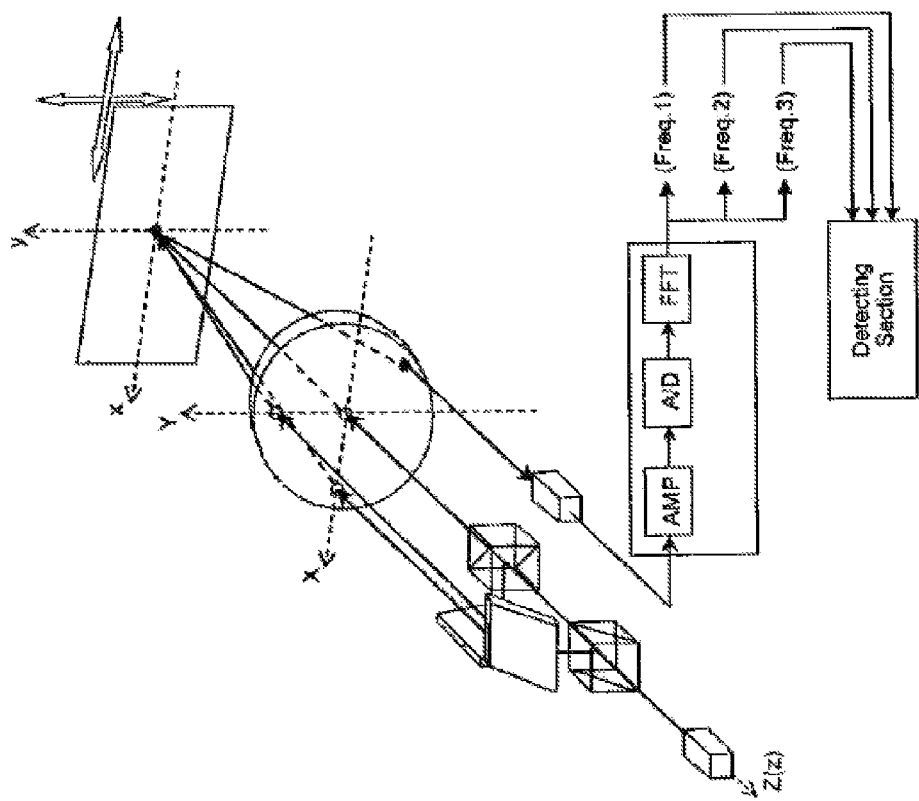
FIG. 3 illustrates still another prior art of an optical displacement sensor.
Figure 4:
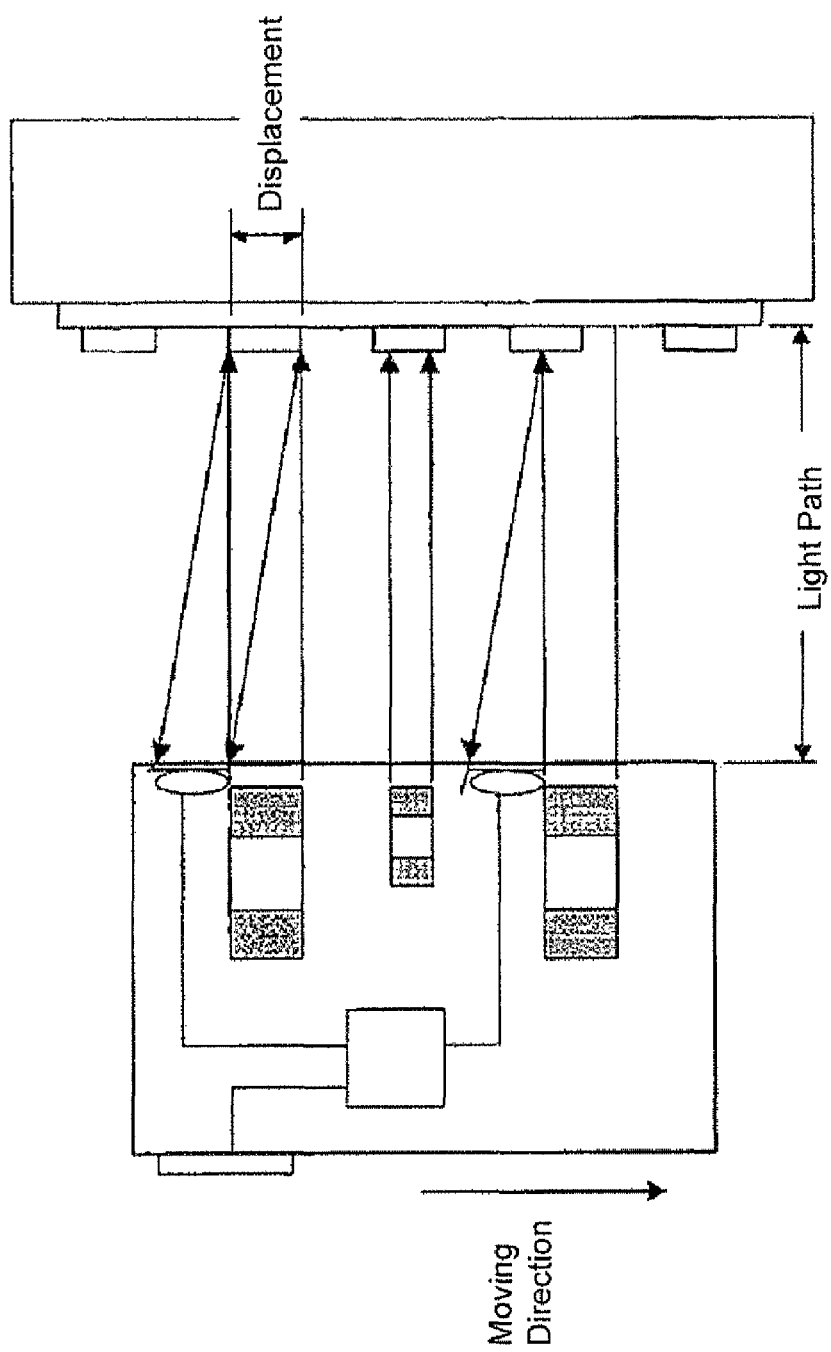
FIG. 4 illustrates a prior art of a pointing system.
Figure 5:
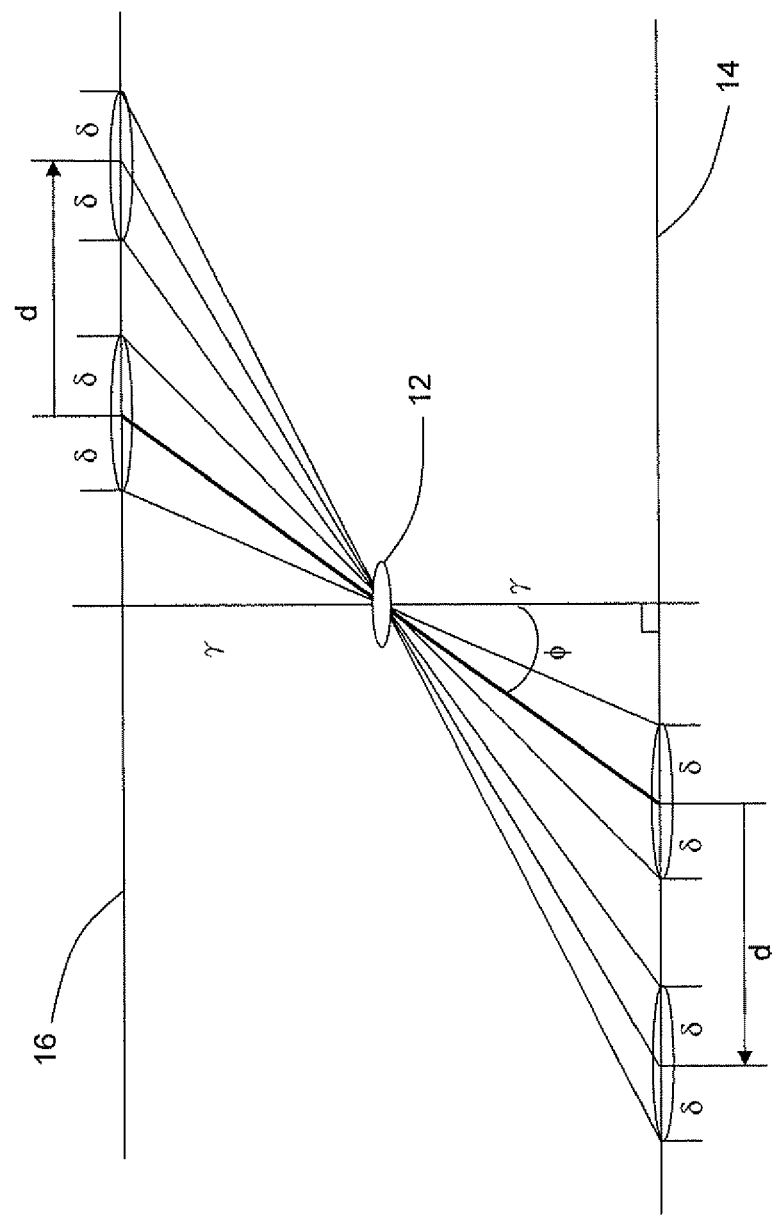
FIG. 5 illustrates the principle used in the present invention.
Figure 6:
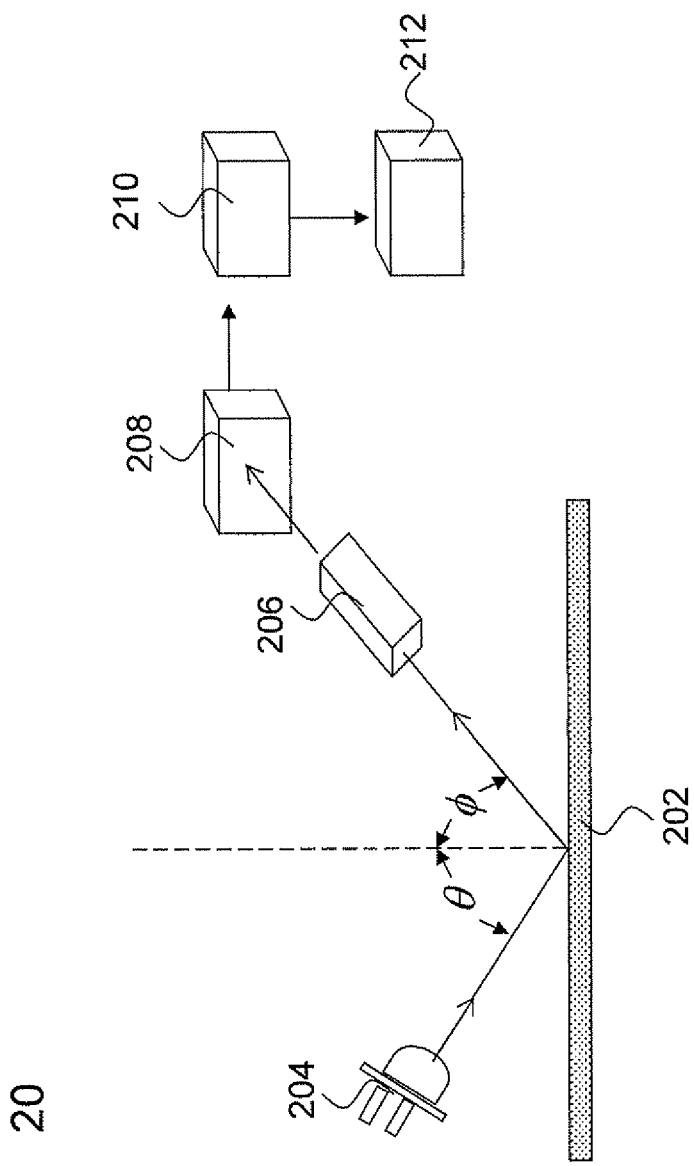
FIG. 6 is a view of a two-dimensional precise positioning structure according to a first embodiment.

Please see FIG. 5. It is used to illustrate the principle used for the present invention.

When a sampling device 12 is moved with respect to a surface 14 by a distance d, the maximum relative optical path difference variation Δ(nL) of laser optical speckle is equal to:

$$\Delta(nL) = \frac{4\delta d}{\gamma} \cos^3 \varphi \quad (1)$$

where δ is average radius of the optical speckle, d is moving distance of the sampling device 12 relative to the surface 14, γ is half of vertical distance from a sensor 16 to the surface 14, φ is sampling angle with respect to normal to the surface, λ is wavelength of laser beams. In order to obtain optical speckle, relative optical path difference variation of equation (1) should be smaller than or equal to ⅕ wavelength. That is, $$\Delta(nL) = \frac{4\delta d}{\gamma}\cos^3\varphi \leq \frac{1}{5}\lambda \Rightarrow d \leq \frac{\lambda\gamma}{20\delta\cos^3\varphi} \qquad (2)$$

With an optical speckle sampling device satisfying equation (2), under the situation that sampling range is smaller than length of d, since constructive optical speckle moves within the sampling range having relative optical path difference variation smaller than ⅕ wavelength, the original constructive optical speckle moves within the sampling range and keeps constructive interference. Hence, light spot won't vanish and the purpose of imaging optical speckle can be achieved. A feature light spot of the laser optical speckle within the sampling range does not deform along with motion and thus has perfect repeatability. Therefore it is very suitable to be utilized in two-dimensional precise positioning systems.

The present invention is illustrated by 6 embodiments:

First Embodiment

Please refer to FIG. 6 to FIG. 9. The present invention provides a technology utilizing optical speckle image to achieve two-dimensional precise positioning. Because laser optical speckle is an interference image, it has higher resolution than general non-interference grayscale. Especially, dimensions of the constructive interference optical speckle can be controlled within several microns by a sampling device so as to provide precise positioning with optical speckle image. The first embodiment has a laser optical speckle two-dimensional precise positioning structure 20 using optical speckles scattered from a non-specular surface shown in FIG. 6. It includes a positioning template 202, an emitting module 204, an optical speckle imaging module 206, a two-dimensional array sensor module 208, an optical speckle identifying/positioning unit 210 and a servo positioning driving device 212.

The positioning template 202 has a surface with unique textures, high rigidity and low deformability, and is non-scratchable and easy to clean. Surface of the positioning template 202 can scatter optical speckle remarkably.

The emitting module 204 can emit a highly coherent parallel light to surface of a target. The emitting module 204 can be a vertical cavity surface emitting laser (VCSEL), an edge emission laser (EEL), a highly coherent gas laser and a highly coherent solid-state laser. Additionally, the emitting module 204 can also emit narrow band light and consist of a highly coherent light emitting diode and a filter. The laser light is emitted at an incident angle θ with respect to normal to the positioning template 202 to irradiate the surface of the positioning template 202. The surface of the positioning template 202 is uniformly irradiated by the incident light. Because the surface of the positioning template 202 has a non-uniform texture, the incident light will be scattered in various directions. The scattered light beams are collected at a sampling angle φ with respect to normal to the surface of the positioning template 202. The sampling angle φ has a range of 0°<φ≦θ−10° or θ+10°≦φ<90°. According to the present embodiment, θ is 60° and φ is 50°. However, φ can be in a range of 0°<φ≦50° or 70°≦φ<90°. Along the direction of the sampling angle, the scattered light beams interfere with each other. The optical speckle image generated from the scattered light beams is captured by an optical speckle imaging module 206. The main purpose to capture optical speckle image along the direction of the sampling angle is to avoid acquiring specular reflected laser beams which contain no feature point data of the surface.

The optical speckle image captured from the specular reflected angle result from light beams reflected and scattered from the surface. Reflected light beams are coherent. In contrast, scattered light beams are incoherent showing three-dimensional feature of the surface. The light beams with different features interfere with each other to form a complex pattern of interference. It is disadvantageous to precise identification and repeatability for interference patterns. Hence, only the interference of the scattered light beams showing three-dimensional feature of the surface patterns is needed. It can clearly and stably show the three-dimensional features of the surface and has very good repeatability. It is suitable for precision positioning by optical speckle image. Additionally, in comparison with small angle offset from the specular reflected direction, it can gather more scattered light energy and advantageous to get a stable optical speckle image and improve noise-signal ratio effectively.

Figure 7:
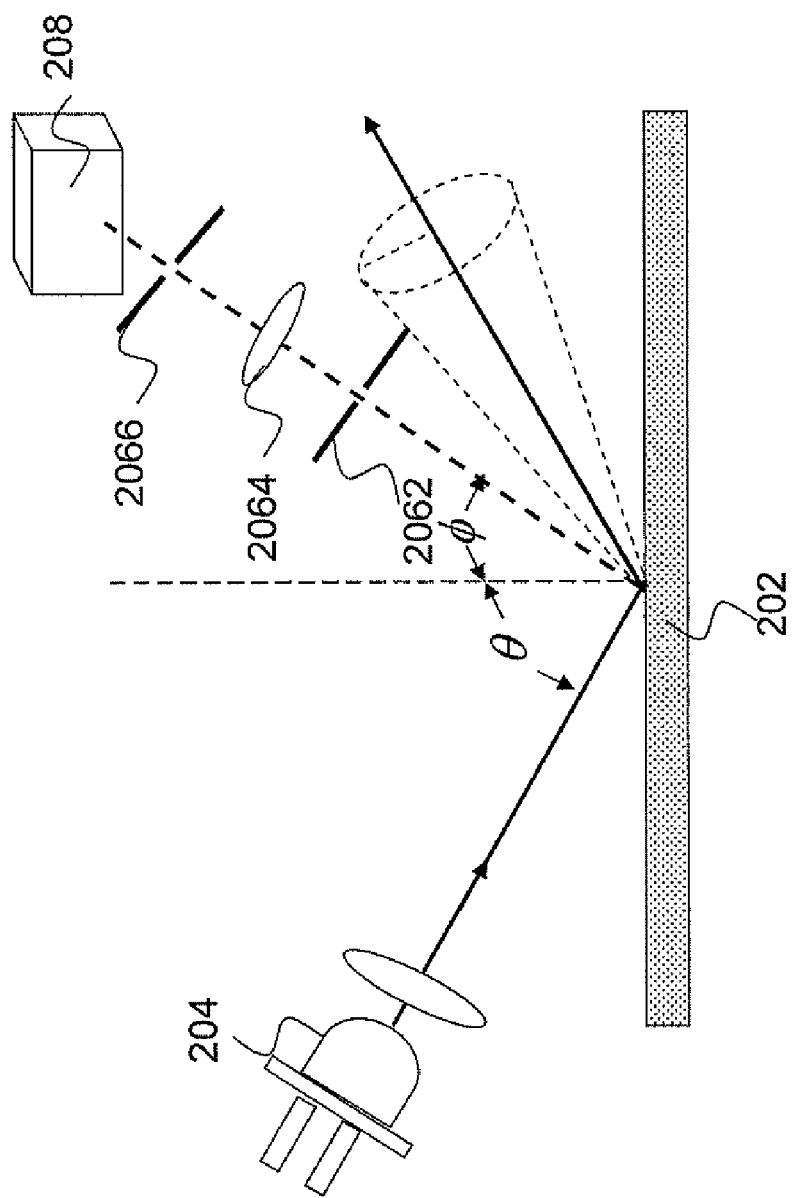
FIG. 7 is a view of a two-dimensional imaging structure according to the first embodiment.

Please refer to FIG. 7. In order to purify the interference optical speckle pattern from the scattered light beams showing the three-dimensional feature of the surface, any light pollution such as stray light must be eliminated. Therefore, the optical speckle imaging module 206 includes a front aperture 2062 for filtering stray light, an imaging lens 2064 for imaging the optical speckle onto the two-dimensional array sensor module 208, and a rear aperture 2066 for limiting incident angle of the light from the imaging lens 2064 and controlling average dimension of the optical speckle with the front aperture 2062. The design entirely filters away stray light at a large angle and unnecessary scattered light beams. Background light interference can be minimized.

In order to have optical speckle patterns with the best resolution, the average dimension of the optical speckle must be greater than or equal to the size of pixel of the two-dimensional array sensor module 208. By controlling the dimension of the rear aperture 2066 and its distance to the two-dimensional array sensor module 208, the average dimension of the optical speckle can be controlled. Average radius of the optical speckle δ can be obtained by:

$$\delta \approx 1.22 \times \frac{\lambda}{D} \times L \qquad (3)$$

where δ is average radius of the optical speckle, λ is laser beams wavelength, D is diameter of the rear aperture 2066, L is distance between the rear aperture 2066 and the two-dimensional array sensor module 208. With a proper arrangement of above parameters, the average radius of the laser optical speckle is equal to or slightly larger than size of a pixel of the two-dimensional array sensor module 208. An optical speckle image with the best resolution can be obtained.

In order to get optical speckle image repeatedly in the sampling range for comparing precise optical speckle patterns and positioning, the imaging structure should satisfy equation (2). Relative position and distance between the constructive feature optical speckle light spots in the sampling range keep unchanged and have very good repeatability. It is suitable for comparing precise optical speckle patterns and positioning.

In order to increase transmission efficiency of the scattered light beams passing the imaging lens 2064, the imaging lens 2064 must be perpendicular to the optical axle of the scattered light beams. The two-dimensional array sensor module 208 includes a charge-coupled device (CCD) sensor or a complementary metal-oxide-semiconductor (CMOS) sensor. In order to have a fixed proportion of the size of the two-dimensional image of the sensor 208 to that of the surface and eliminate projection effect, which occurs when magnifying power with respect to vertical incident plane and magnifying power with respect to parallel incident plane are different. The sensing plane of the two-dimensional array sensor module 208 must be parallel to the surface. The two-dimensional array sensor module 208 is used to record the laser optical speckle image and sends the recorded image to the optical speckle identifying/positioning unit 210 spontaneously. The optical speckle identifying/positioning unit 210 will compare the optical speckle image data with that stored in a look-up table (not shown) and proceed with positioning. Coordinates over the positioning template 202 irradiated by the coherent light beams can be defined. Distance of movement and its direction for the servo positioning driving device 212 can be calculated with the coordinates and target coordinates.

Figure 8:
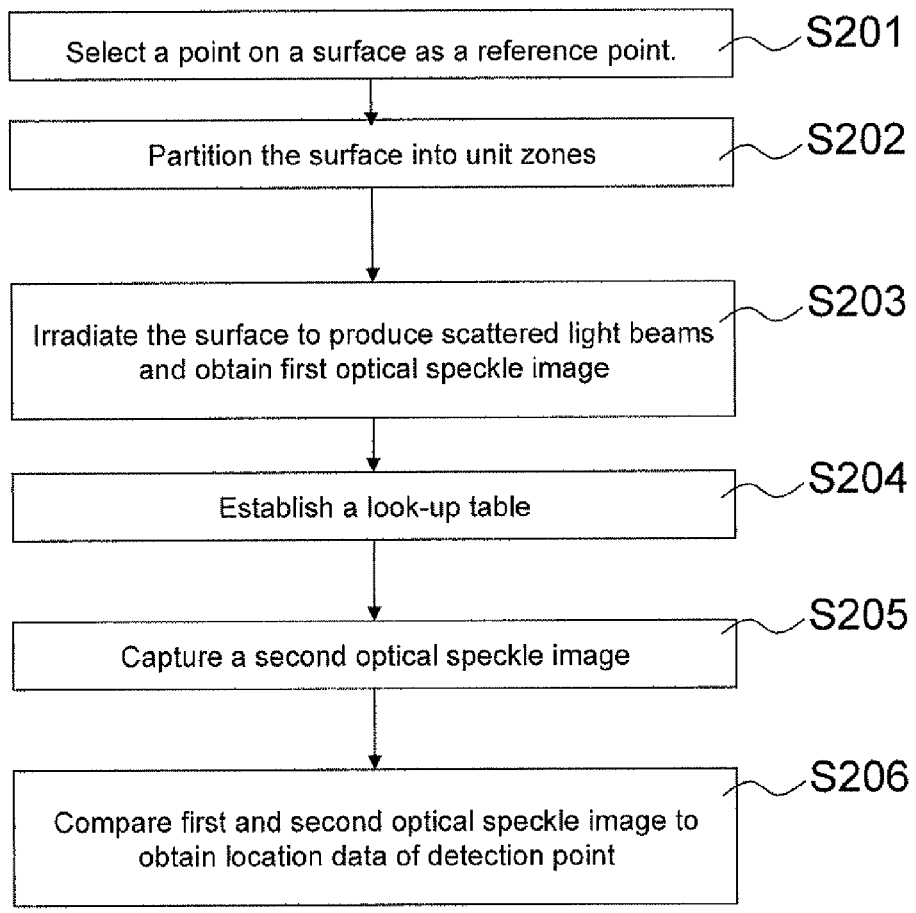
FIG. 8 is a flow chart of a two-dimensional precise positioning method according to the present invention.

Please refer to FIG. 8. Method for the structure 20 to process two-dimensional precise positioning is described below. Firstly, a point on the positioning template 202 is selected as a reference point (step S201). Then, the surface is partitioned into several unit zones to form a two-dimensional zone array and set location data for the unit zones with respect to the reference point (step S202). Next, the surface is irradiated with laser beams from a highly coherent parallel light source of the emitting module 204 at incident angle θ to generate scattered light beams. A sampling angle φ is set with respect to normal to the positioning template 202 to capture a first optical speckle image formed by the scattered light beams at the sampling angle in every unit zone (step S203). Later, a look-up table is established containing the location data (coordinates) of each unit zone and corresponding first optical speckle image thereof and recorded by the two-dimensional array sensor module 208 (step S204). A second optical speckle image of a detection point is obtained at the sampling angle φ by the optical speckle imaging module 206 (step S205). Subsequently, the optical speckle identifying/positioning unit 210 is used to compare the second optical speckle image with the first optical speckle image in the look-up table to obtain relative location of the detection point to the unit zone. Then, based on the look-up table, the location data (coordinates) of the detection point with respect to the reference point is obtained (step S206). At last, the servo positioning driving device 212 moves a target a certain distance in a specified direction. The purpose of absolute positioning by using optical speckle is achieved.

Second Embodiment

In the first embodiment, it is inconvenient to repeatedly form optical speckle images, and to match the optical speckle images with that of the detection point, to locate the detection point in the positioning template 202. There is a way to make imaging of the optical speckle by the positioning template 202, comparing and positioning more convenient and faster.

Figure 9:
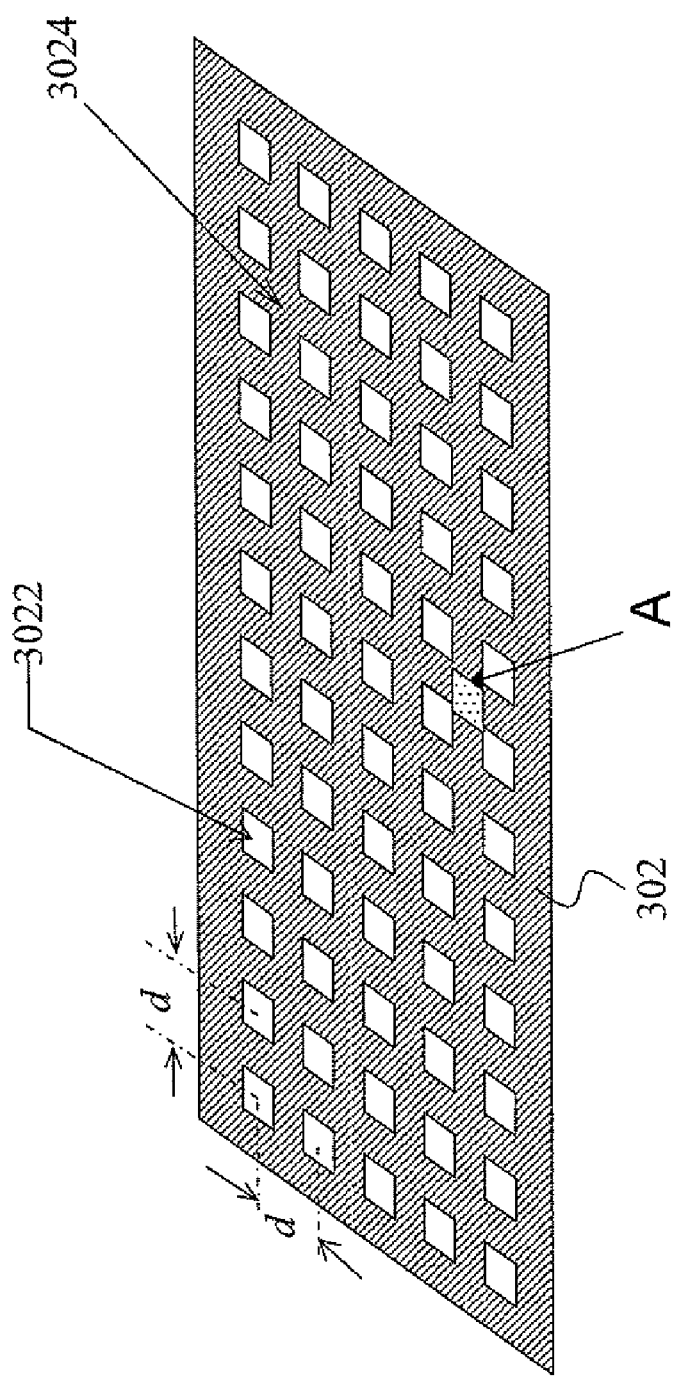
FIG. 9 is a view of a positioning template according to the present invention.
Figure 10:
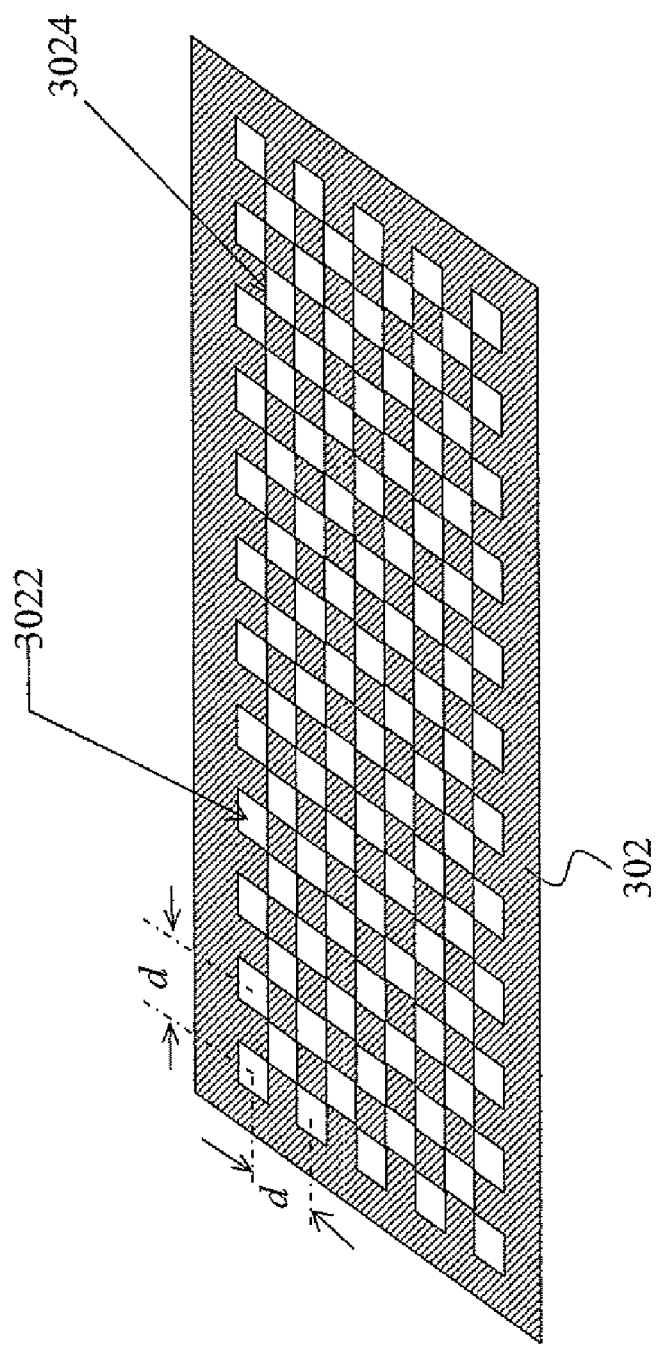
FIG. 10 is a view of another positioning template according to the present invention.

Please refer to FIG. 9 to FIG. 13. FIG. 9 and FIG. 10 illustrate a positioning template 302 provided with optical speckle positioning zones 3022 and one or more dark zones 3024 between adjacent optical speckle positioning zones 3022. According to the present invention, the dark zone 3024 can be a continuous region as shown in FIG. 9, or it can have discrete zones as shown in FIG. 10. The so-called dark zone has a characteristic that when laser beams irradiate on it, the dark zone substantially transmit, absorb or reflect the laser beams so that no scattered light beams are generated in the dark zone. Hence, within the sampling angle range, no optical speckle is obtained in the dark zone.

When the laser beams continuously irradiate the dark zone 3024 and the optical speckle positioning zones 3022, reflected optical speckle energy in the dark zone 3024 is zero. Therefore, a periodical energy change of optical speckles across the surface is formed. By counting number of peaks or valleys of the optical speckle energy between a detection point and the reference point, location data of the unit zone where the detection point is located can be identified. It can reduce errors and time consumption in comparing the second optical speckle image and the first optical speckle image in the look-up table in the first embodiment.

With the dark zone 3024, it is easy to offer a coordinate to an optical speckle image of the optical speckle positioning zone 3022. The amount of peaks or valleys between the detection point and the reference point is counted in order to identify the optical speckle image and perform positioning in the next stage.

Figure 11:
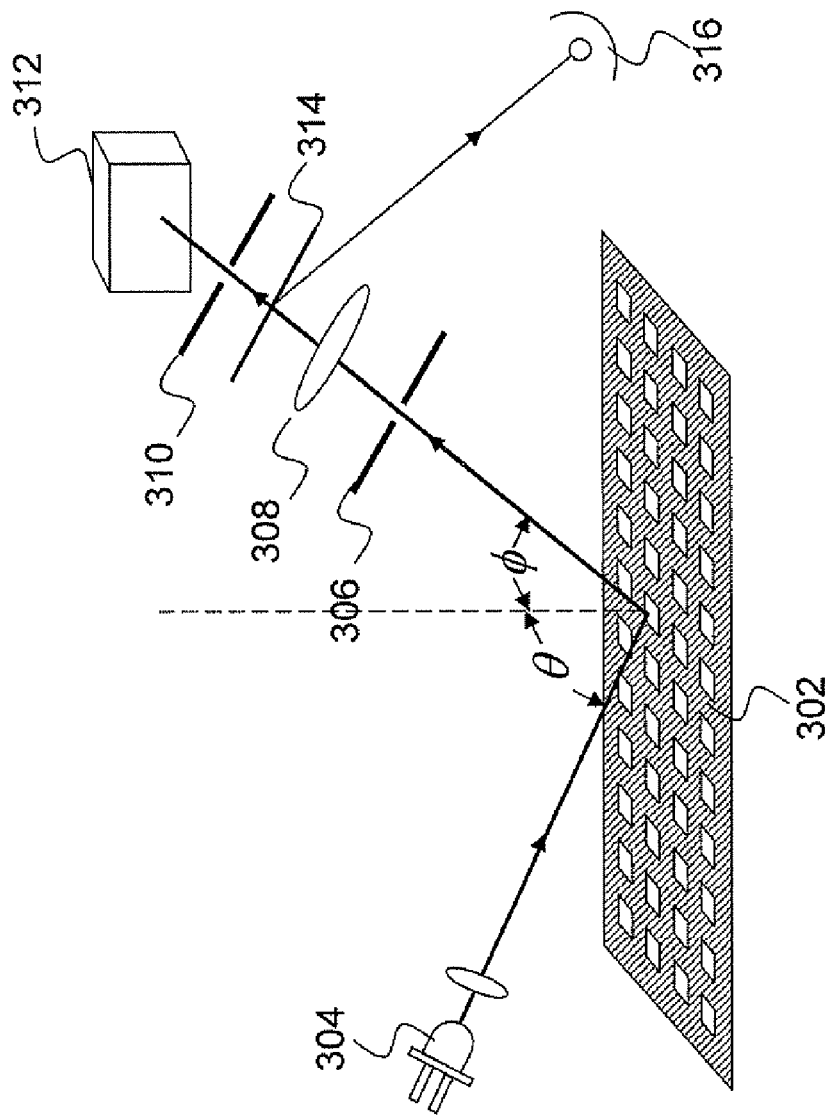
FIG. 11 is a view of another two-dimensional imaging structure according to the present invention.
Figure 12:
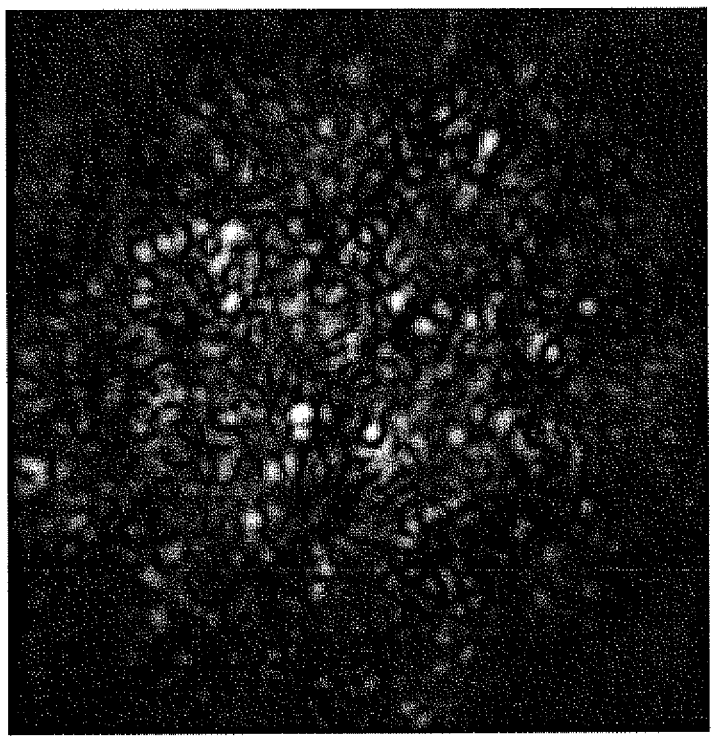
FIG. 12 illustrates an optical speckle pattern received by a sensor module according to the present invention.

With the positioning template 302 having the dark zone 3024, a semi-reflective mirror 314 is added in the two-dimensional imaging structure 20 in the first embodiment to form a two-dimensional imaging structure 30 as shown in FIG. 11. The two-dimensional imaging structure 30 includes an emitting module 304, a front aperture 306, an imaging lens 308, a rear aperture 310, a two-dimensional array sensor module 312, and the semi-reflective mirror 314 located between the imaging lens 308 and the rear aperture 310. In the structure, the semi-reflective mirror 314 can partially reflect optical speckle imaging energy to an optical speckle energy sensor 316 and partially pass the optical speckle imaging energy to the two-dimensional array sensor module 312 to form the optical speckle image. Please refer to FIG. 12. The area that the emitting module 304 irradiates the positioning template 302 is around the size of the optical speckle positioning zone 3022.

Figure 13:
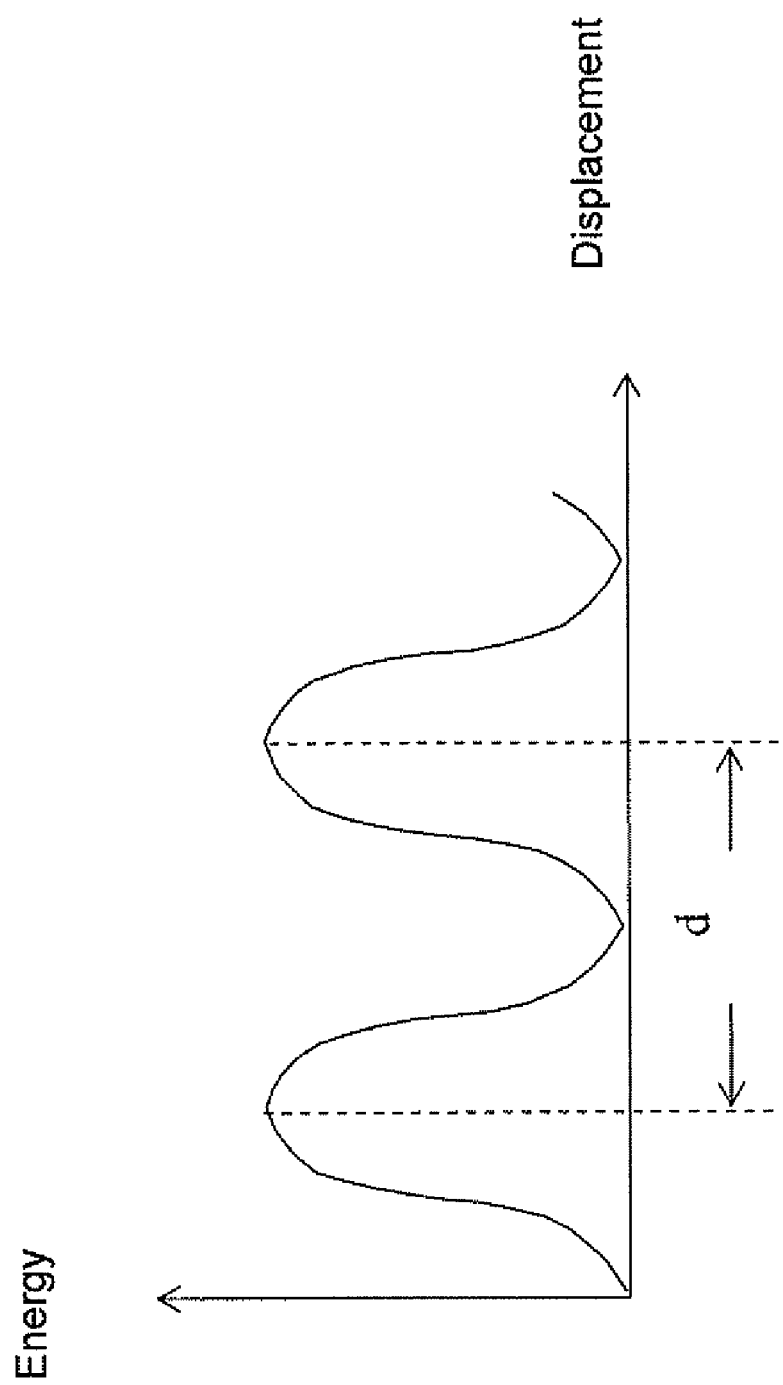
FIG. 13 illustrates the relationship between displacement of an emitting module and change of energy read by an energy sensor.

Please see FIG. 13 in which d represents distance between two adjacent peaks. As mentioned above, when the laser beams move horizontally or vertically over the positioning template 302, due to the dark zone 3024, the optical speckle energy sensor 316 will detect a bright/dark signal. The bright/dark signal is then differentiated to obtain a slope thereof. When the slope is zero and the signal has a waveform curved downwards, the detection point is at the center of the optical speckle positioning zone 3022. When the slope is zero and the signal has a waveform curved upwards, the detection point is at the center of the dark zone 3024. By counting the peaks or valleys of the signal, the optical speckle positioning zone 3022 where the detection point is located can be identified. By this way, offset of the detection point from the location of the identified optical speckle positioning zone 3022 can be limited to positioning zone size or less (i.e., coarse positioning). When the coarse positioning is done, optical speckle image of the detection point is compared with the optical speckle image of the identified optical speckle positioning zone 3022 stored in the lookup table, then the location data (coordinates) of the detection point is determined (i.e., fine positioning).

Due to the characteristic that the optical speckle image moves without deformation, even if the optical speckle image of the identified optical speckle positioning zone 3022 and the optical speckle image of the detection point do not perfectly match which is caused by the offset mentioned above, the two optical speckle images are almost identical in overlapped imaging area. Therefore, positioning precision by such comparison can be smaller than a pixel in the sensor module 312. It makes the absolute positioning technique of optical speckle image have very high positioning precision and wide applications. For example, an absolute positioning optical speckle ruler can replace traditional optical ruler and a two-dimensional absolute optical speckle automatic positioning system can replace conventional ones, such as CDD automatic positioning systems and magnetically induced automatic positioning systems.

Third Embodiment

It is mentioned in the second embodiment to reduce offset and time consumption in optical speckle image comparison by using dark zone. Please refer to FIG. 9 again. The dark zone 3024 has a size equal to that of the optical speckle positioning zone 3022. When the detection point is in the dark zone 3024, the two-dimensional array sensor module 312 receives no scattered light beams.

Figure 14:
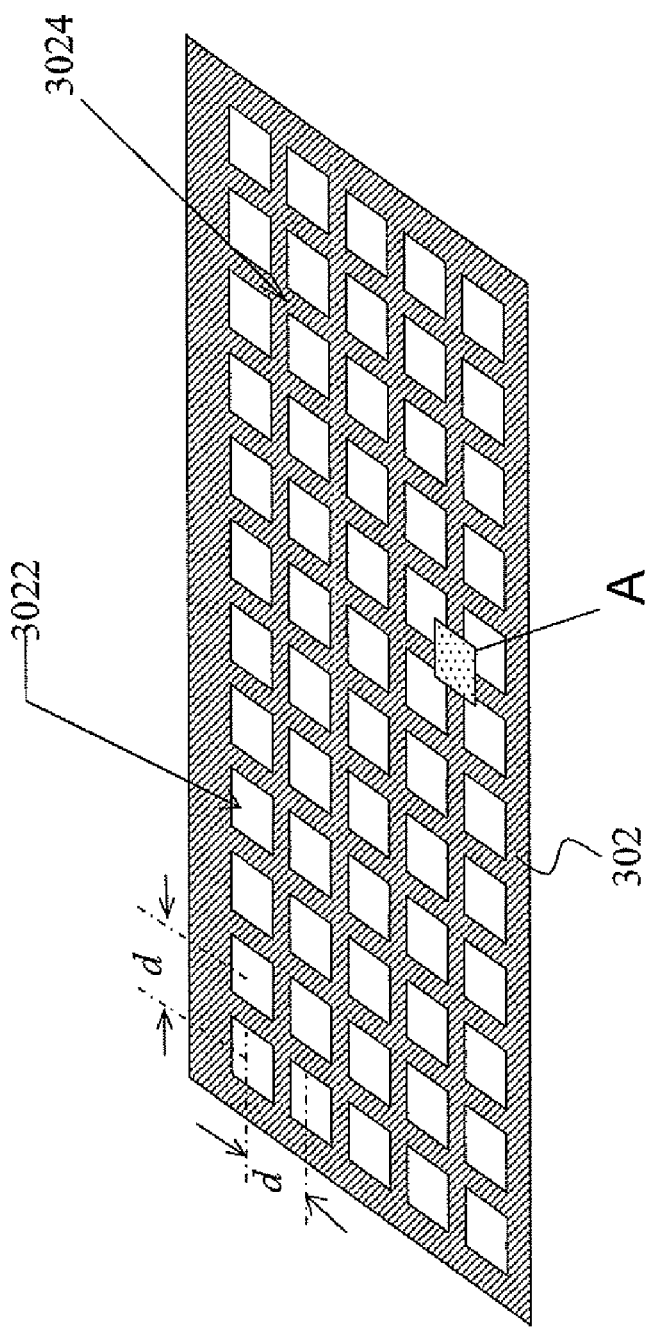
FIG. 14 is a view of still another positioning template according to the present invention.

In order to solve this problem, referring to FIG. 14, the elements shown in FIG. 9 are used but the area of the dark zone is reduced. In other words, the dark zone 3024 has a size smaller than that of the optical speckle positioning zone 3022. For example, the length and width thereof are ¼ of the optical speckle positioning zone. Under this situation, even though detection point A is in the dark zone 3024, there are still some portions overlapping with the optical speckle positioning zone 3022 for positioning purpose.

Fourth Embodiment

In FIG. 9, only the optical speckle positioning zone 3022 can reflect the coherent light, and the rest area of the positioning template 302 is the dark zone 3024 where no optical speckle image is obtained. For full range positioning, sometimes, optical speckle image from the useless area are received. In order to cause the energy sensor to receive the optical speckle signal with bright/dark change to meet the requirements for both coarse positioning and fine positioning, the structure of the arrayed positioning zone in FIG. 9 is modified as a positioning template 402 in FIG. 15.

Figure 15:
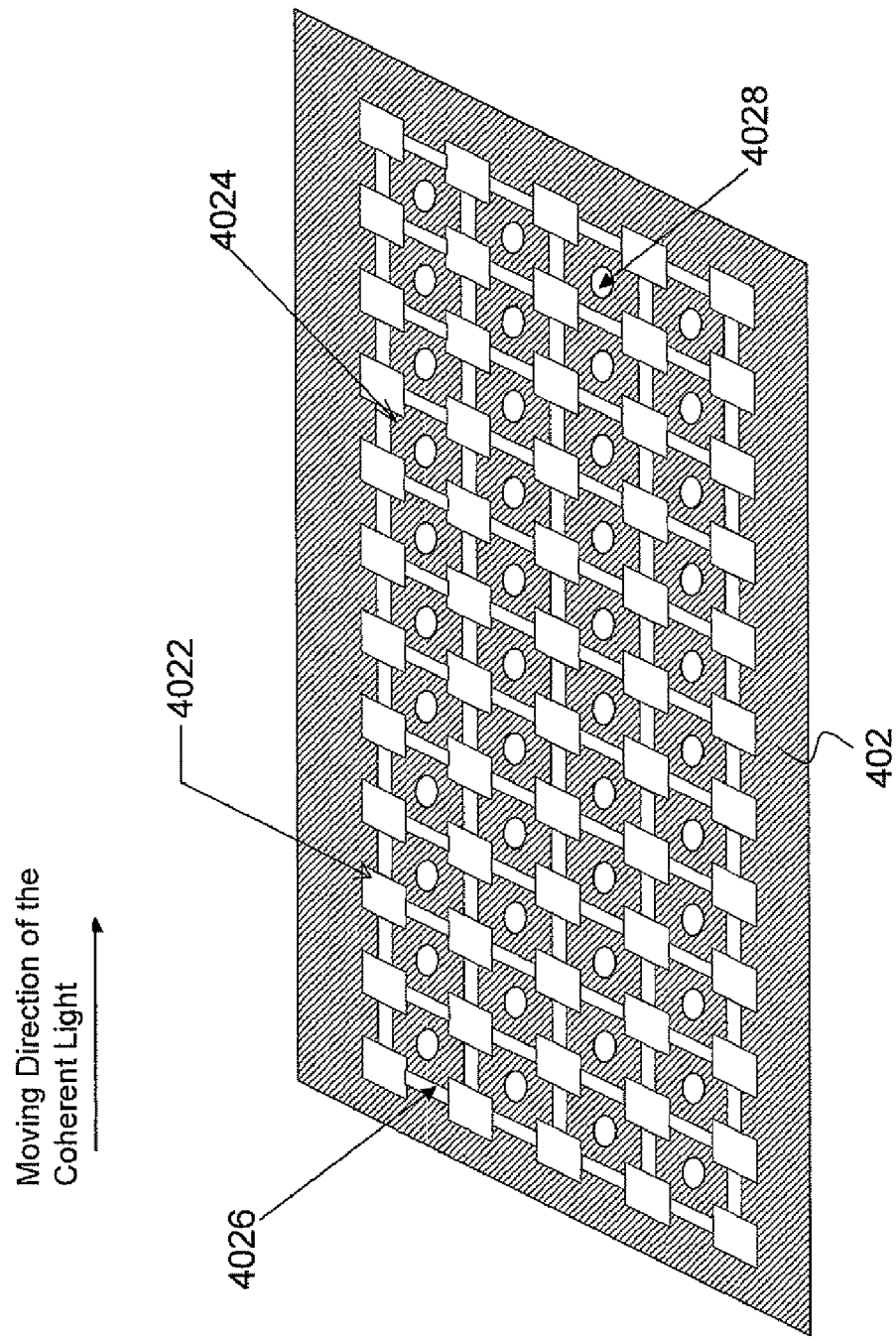
FIG. 15 is a view of yet another positioning template according to the present invention.
Figure 16:
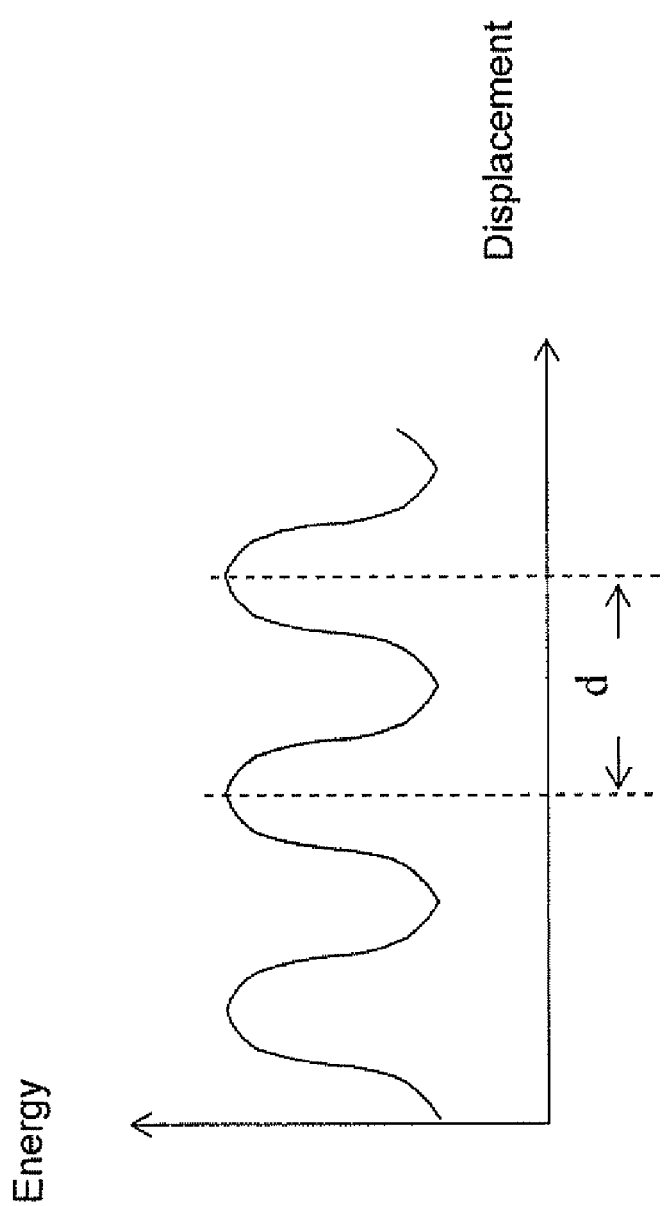
FIG. 16 illustrates the relationship between displacement of an emitting module and change of energy read by an energy sensor.

In the structure in FIG. 15, dark zones 4024 between adjacent optical speckle positioning zones 4022 are linked by optical speckle positioning strips 4026. The optical speckle positioning strips 4026 have a width about ⅓ of that of the optical speckle positioning zone 4022. Hence, the optical speckle image energy in the optical speckle positioning strips 4026 is about ⅓ of the optical speckle positioning zone 4022. When the optical speckle positioning zones 4022 and the optical speckle positioning strips 4026 are irradiated, a periodical energy change of optical speckles across the surface occurs. As shown in FIG. 16, requirement of the coarse positioning is fulfilled. When positioning is carried out in the optical speckle positioning strips 4026, the optical speckle positioning strips 4026 can provide sufficient optical speckle images to meet needs of optical speckle images for the fine positioning. By counting number of the peaks or valleys of the optical speckle energy between the detection point and the reference point, the location data of the positioning zone where the detection point is can be identified.

Furthermore, there is a large dark zone 4024 surrounded by four adjacent optical speckle positioning zones 4022 which is unable to offer reference optical speckle images. In order to satisfy requirement of precise positioning for this area, a circular auxiliary positioning zone 4028 is provided in the dark zone 4024 surrounded by four adjacent optical speckle positioning zone 4022 for helping locate the detection point. The auxiliary positioning zone can form optical speckle images. Diameter of the circular auxiliary positioning zone 4028 is around half of the length of the optical speckle positioning zone 4022. The arrangement can satisfy requirements of the coarse and fine positioning.

Figure 17:
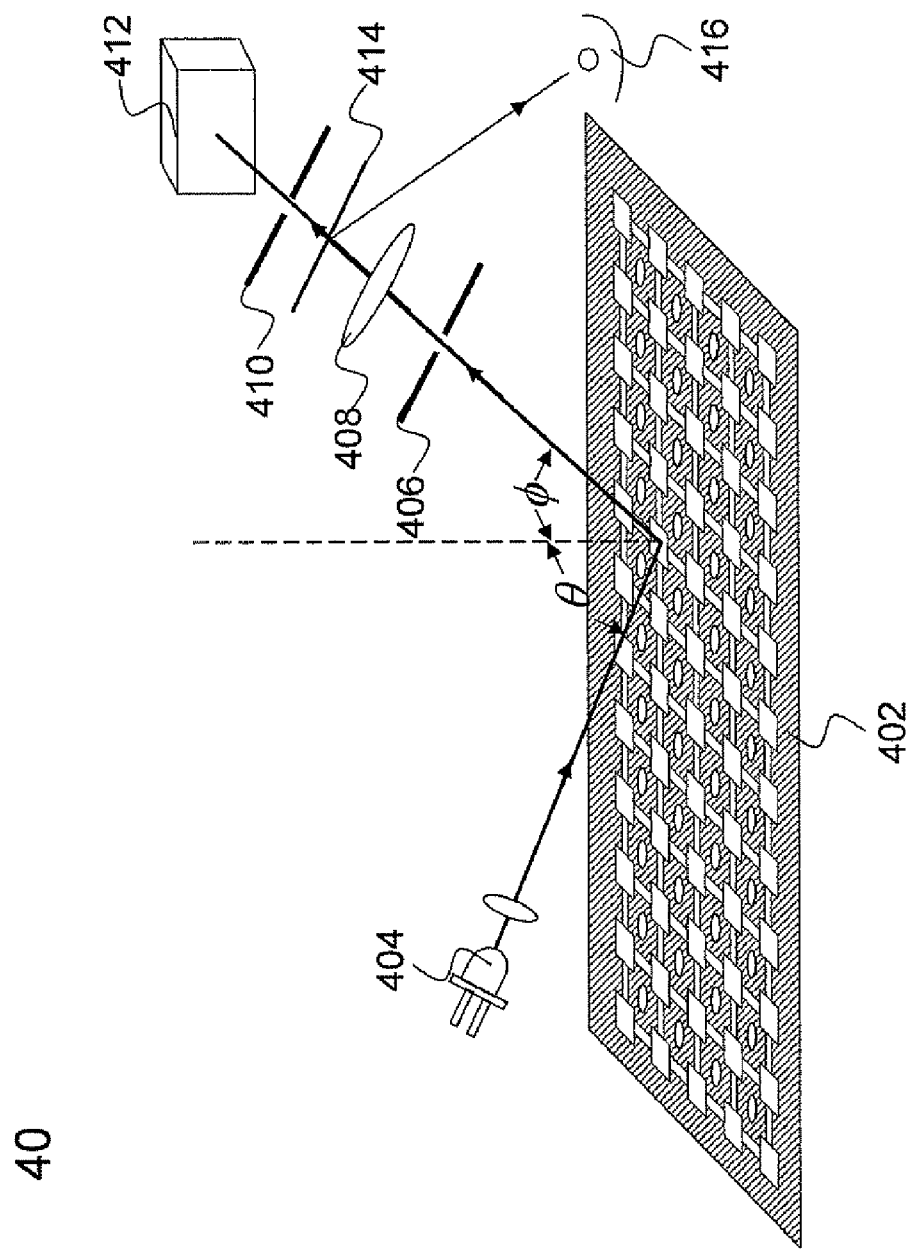
FIG. 17 is a view of still another two-dimensional imaging structure according to the present invention.

A full-ranged precise two-dimensional imaging structure 40 using the positioning template 402 in FIG. 15 is shown in FIG. 17. The structure is similar to that of the second embodiment and has an emitting module 404, a front aperture 406, an imaging lens 408, a rear aperture 410, a two-dimensional array sensor module 412, a semi-reflective mirror 414 and an optical speckle energy sensor 416, in which like elements have like functions. The structure can provide precise optical speckle images for the coarse and fine positioning in the positioning template 402. Positioning precision can be smaller than the size of a pixel of the sensor module 412.

Fifth Embodiment

Figure 18:
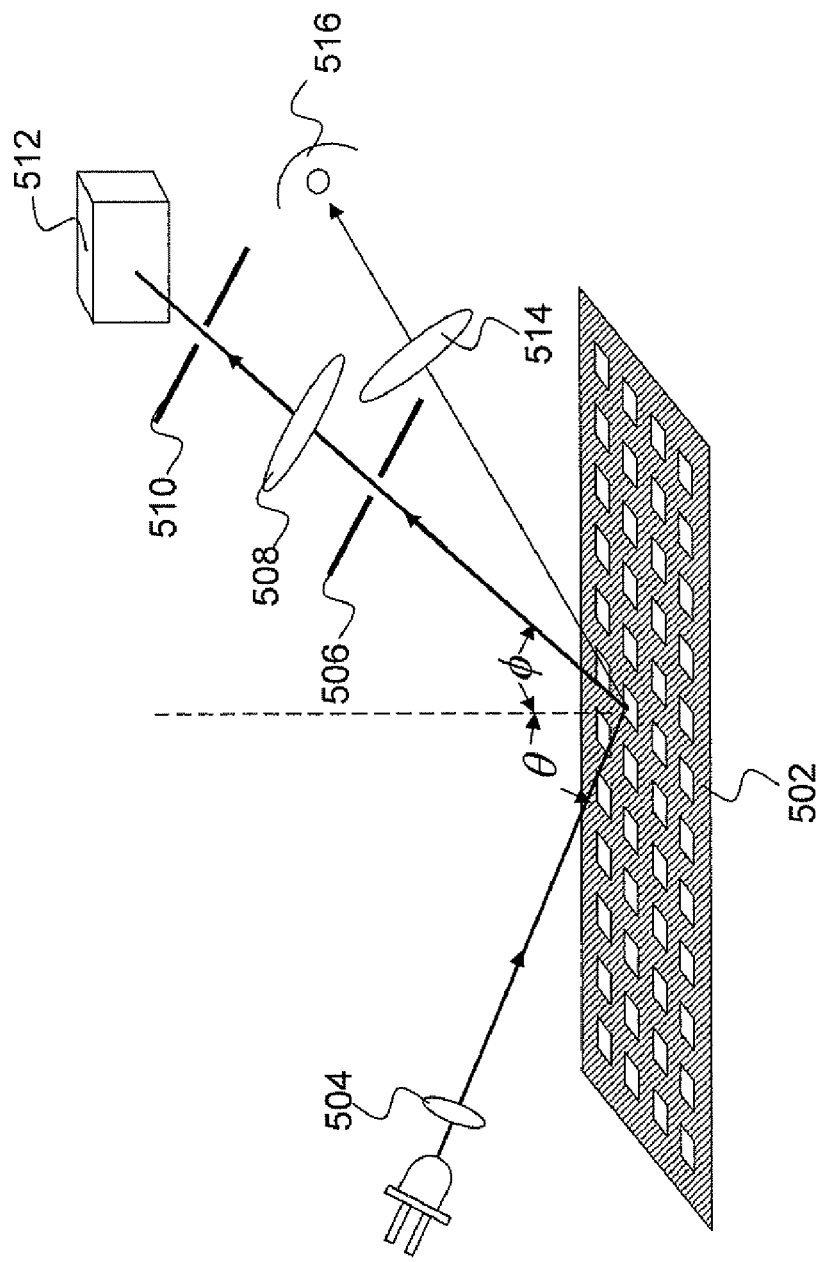
FIG. 18 is a view of yet another two-dimensional imaging structure according to the present invention.

The two-dimensional imaging structure 40 described in the fourth embodiment is modified into a imaging structure 50 shown in FIG. 18 by removing the semi-reflective mirror 414 and adding a condensing lens 514 for condensing the reflected light beams to an energy sensor 516 in the specular reflection direction. In this embodiment, the dark zone 3024 in FIG. 10 according to the second embodiment is replaced with a partially reflective zone which has lower reflectivity than that of the positioning zone. Therefore, the positioning template has no dark zone. In other words, in the present embodiment, any point in the positioning template can provide an optical speckle image. When the positioning template is irradiated by laser beams, change of optical speckle energy detected by the energy sensor 516 in the specular reflection direction is shown in FIG. 16. Of course, using a semi-reflective mirror for reflecting scattered light partially to the energy sensor 516 in order to help identifying process of the energy sensor 516 is an alternative.

In FIG. 18, the imaging structure is used to provide reflected light beams in the specular reflection direction. The energy sensor 516 can detect signal change for achieving the coarse positioning. For non-specular reflection, in the direction of $\phi=\theta-10°$, a front aperture 506, an imaging lens 508 and a rear aperture 510 are used to get optical speckle image for fine positioning. The structure is similar to that in the third embodiment and has a positioning template 502, an emitting module 504, the front aperture 506, the imaging lens 508, the rear aperture 510, a two-dimensional array sensor module 512, and the optical speckle energy sensor 516. Like elements have like functions in FIG. 17, and thus the description thereof is omitted hereinafter.

Like the imaging structure in the present embodiment, the energy sensors of the third embodiment and the fourth embodiment can be provided in the direction of angle of reflection for obtaining a periodical energy change of optical speckles across the surface.

Sixth Embodiment

The positioning templates shown in FIG. 17 and FIG. 18 can be replaced with an elongated rectangular board for performing one-dimensional precise positioning. All the positioning templates in the preceding embodiments can also be replaced with an elongated rectangular board, which can be deemed as an optical speckle ruler. It can be used for one-dimensional precise optical speckle positioning. Due to absolute positioning, it has different operation principle from general optical rulers in the market and it has good competition. Two optical speckle rulers perpendicular to each other can be used for another type of two-dimensional precise positioning. Three optical speckle rulers spatially perpendicular to one another can be used for three-dimensional precise positioning. Thus, application of combination of the optical speckle rulers has a huge market. Besides, the technique in the present invention can be applied to identifying devices for finance or banking. For example, three-dimensional finger print readers, security cards, keys, mechanical arm positioning apparatuses.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A positioning method by using optical speckles, comprising the steps of:
   a) selecting a point on a surface having unique textures as a reference point;
   b) partitioning the surface into a plurality of unit zones to form a two-dimensional zone array and setting location data for the unit zones with respect to the reference point;
   c) irradiating the surface with a highly coherent parallel light at an incident angle $\theta$ to produce scattered light beams and setting a sampling angle $\phi$ with respect to normal to the surface for obtaining a first optical speckle image formed by the scattered light beams in every unit zone at the sampling angle $\phi$;
   d) establishing a look-up table containing the location data of each unit zone and corresponding first optical speckle image thereof;
   e) capturing a second optical speckle image of a detection point at the sampling angle $\phi$;
   f) identifying the unit zone where the detection point is located, comprising:
      f1) inserting between two adjacent unit zones a dark zone, which can substantially transmit, absorb or reflect the highly coherent parallel light so that no scattered light beams are generated in the dark zone to form the first optical speckle image or the second optical speckle image, thereby forming a periodical energy change of optical speckles across the surface; and
      f2) counting number of peaks of optical speckle energy between the detection point and the reference point for identifying the unit zone where the detection point is located; and
   comparing the first optical speckle image in the unit zone where the detection point is located with the second optical speckle image for obtaining relative location of the detection point to the unit zone, and calculating location data of the detection point with respect to the reference point based on the relative location and location data of the unit zone where the detection point is located.

2. The method according to claim 1, wherein the dark zone has a size smaller than or equal to that of the unit zone.

3. A positioning method by using optical speckles, comprising the steps of:
   a) selecting a point on a surface having unique textures as a reference point;
   b) partitioning the surface into a plurality of unit zones to form a two-dimensional zone array and setting location data for the unit zones with respect to the reference point;
   c) irradiating the surface with a highly coherent parallel light at an incident angle $\theta$ to produce scattered light beams and setting a sampling angle $\phi$ with respect to normal to the surface for obtaining a first optical speckle image formed by the scattered light beams in every unit zone at the sampling angle $\phi$;
   d) establishing a look-up table containing the location data of each unit zone and corresponding first optical speckle image thereof;
   e) capturing a second optical speckle image of a detection point at the sampling angle $\phi$;
   f) identifying the unit zone where the detection point is located, comprising:
      f1) inserting between two adjacent unit zones a reference zone having optical speckle energy lower than that of the unit zones for forming a periodical energy change of optical speckles; and
      f2) counting number of peaks of optical speckle energy between the detection point and the reference point for identifying the unit zone where the detection point is located; and
   comparing the first optical speckle image in the unit zone where the detection point is located with the second optical speckle image for obtaining relative location of the detection point to the unit zone, and calculating location data of the detection point with respect to the reference point based on the relative location and location data of the unit zone where the detection point is located.

4. The method according to claim 1 or 3, wherein an auxiliary positioning zone in which an optical speckle image can be formed is created among four adjacent unit zones for helping locate the detection point.

5. A positioning system by using optical speckles, comprising:
   a template having an unique texture surface;
   an emitting module, for emitting a highly coherent parallel light to irradiate the surface at an incident angle $\theta$ to generate scattered light beams;
   an optical speckle imaging module, provided at a sampling angle $\phi$ from normal to the surface, for obtaining a first optical speckle image of the scattered light beams generated by irradiating the surface with the highly coherent parallel light and a second optical speckle image of scattered light beams generated by irradiating a detection point;
   a sensor module for storing the first optical speckle image and the second optical speckle image; and
   an identifying/positioning unit for comparing the first optical speckle image and the second optical speckle image, thereby obtaining a location data of the detection point;
   wherein the optical speckle imaging module comprises: an imaging lens for imaging the optical speckle onto the sensor module; a front aperture, provided between the imaging lens and the template, for filtering scattered light beams; and a rear aperture, located opposite to the front aperture with respect to the imaging lens, for controlling average radius of the optical speckle, wherein the imaging lens, the front aperture and the rear aperture are linearly arranged in sequence; and
   wherein the average radius of the optical speckle can be obtained by controlling size of the rear aperture and distance from the rear aperture to the sensor module with a relation of:

$$\delta \approx 1.22 \times (\lambda/D) \times L$$

where $\delta$ is average radius of the optical speckle, $\lambda$ is wavelength of the highly coherent parallel light, D is diameter of the rear aperture, and L is distance between the rear aperture and the sensor module.

6. The system according to claim 5, further comprising a positioning driving device for driving a target to a designated location by comparing the location data of the detection point obtained by the identifying/positioning unit and the designated location.

7. The system according to claim 5, wherein the sampling angle $\phi$ is in the range of $0<\phi\leqq\theta-10°$ or $\theta+10°\leqq\phi<90°$.

8. The system according to claim 5, wherein the emitting module comprises a vertical cavity surface emitting laser (VCSEL), an edge emission laser (EEL), a gas laser, a solid-state laser, or a combination of a light emitting diode producing narrow band light and a filter.

9. The system according to claim 5, wherein the sensor module comprises a charge-coupled device (CCD) or a complementary metal-oxide-semiconductor (CMOS) sensor.

10. The system according to claim 5, wherein the optical speckle imaging module comprises a condensing lens, located in a path of the scattered light beams at the sampling angle $\phi$, for condensing energy of the optical speckle to an energy sensor.

11. The system according to claim 5, wherein the optical speckle imaging module comprises a semi-reflector, located between the imaging lens and the rear aperture, for partially reflecting energy of the optical speckle to an energy sensor.

12. The system according to claim 5, wherein the optical speckle imaging module comprises a condensing lens, located in a path of light beam reflected from the surface, for condensing energy of the optical speckle to an energy sensor.

\* \* \* \* \*